(12) United States Patent
Naccache

(10) Patent No.: US 7,206,408 B1
(45) Date of Patent: Apr. 17, 2007

(54) COUNTERMEASURE METHOD IN AN ELECTRONIC COMPONENT USING A DYNAMIC SECRET KEY CRYPTOGRAPHIC ALGORITHM

(75) Inventor: David Naccache, Paris (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/959,944

(22) PCT Filed: May 11, 2000

(86) PCT No.: PCT/FR00/01269

§ 371 (c)(1),
(2), (4) Date: Feb. 20, 2002

(87) PCT Pub. No.: WO00/68901

PCT Pub. Date: Nov. 16, 2000

(30) Foreign Application Priority Data

May 11, 1999 (FR) .................................. 99 06264

(51) Int. Cl.
*H04K 1/04* (2006.01)
*H04L 9/00* (2006.01)
*H04K 1/02* (2006.01)

(52) U.S. Cl. .............................. 380/44; 380/30; 380/37

(58) Field of Classification Search .................. 380/30, 380/44, 37
See application file for complete search history.

(56) References Cited

U.S. PATENT DOCUMENTS

| 4,932,053 | A | | 6/1990 | Fruhauf |
| 5,347,581 | A | * | 9/1994 | Naccache et al. ............. 380/30 |
| 5,910,989 | A | * | 6/1999 | Naccache ................... 713/173 |
| 5,946,397 | A | * | 8/1999 | M'Raihi et al. .............. 380/30 |

FOREIGN PATENT DOCUMENTS

| DE | 4223258 A | 1/1994 |
| EP | 0605996 A | 7/1994 |
| FR | 2745924 A | 9/1997 |
| WO | WO9607994 A | 3/1996 |
| WO | WO9730424 A | 8/1997 |
| WO | WO9736264 A | 10/1997 |

* cited by examiner

*Primary Examiner*—Gilberto Barrón, Jr.
*Assistant Examiner*—Venkat Perungavoor
(74) *Attorney, Agent, or Firm*—Buchanan Ingersoll & Rooney PC

(57) ABSTRACT

A countermeasure method in a first electronic component communicating with a second electronic component uses a secret key K[0] cryptographic algorithm A of size k. The countermeasure implementation employs a systematic and regular evolution of K[i] by a function K[i]=f(k[i−1]), and transmission of i to the second component. A computational shortcut enables the second component to compute K[i] from K[0] without having to generate the i−1 keys K[1] to K[i−1] separating K[0] and K[i].

17 Claims, 7 Drawing Sheets

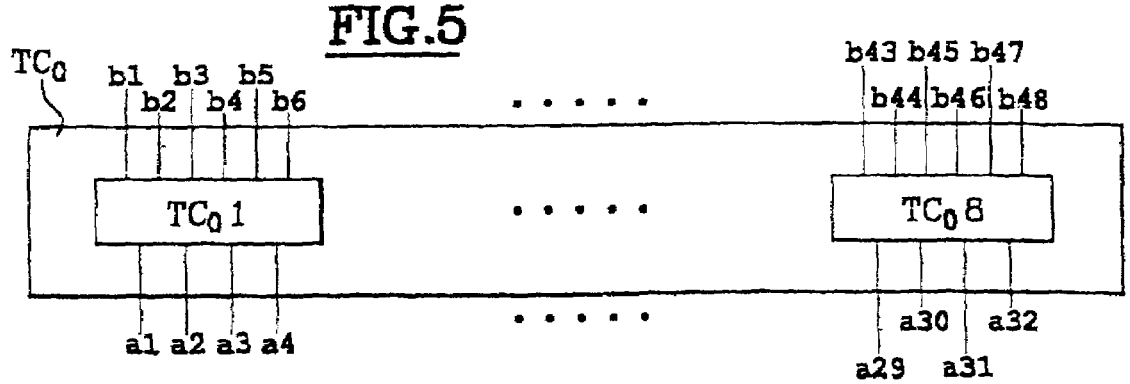

COUNTERMEASURE METHOD IN AN ELECTRONIC COMPONENT USING A DYNAMIC SECRET KEY CRYPTOGRAPHIC ALGORITHM

This disclosure is based upon French Application No. 99/06264, filed on May 11, 1999 and International Application No. PCT/FR00/01269, filed May 11, 2000, which was published on Nov. 16, 2000 in a language other than English, the contents of which are incorporated herein by reference.

BACKGROUND OF THE INVENTION

The present invention relates to a countermeasure method in an electronic component using a secret-key cryptographic algorithm. Such components are used in applications where access to services or data is strictly controlled. They have an architecture formed around a microprocessor and memories, including a program memory which contains the secret key.

These components are notably used in smart cards, for certain applications thereof. These are for example applications concerning access to certain databanks, banking applications, or remote payment applications, for example for television, petrol dispensing or passing through motorway tolls.

These components or cards therefore use a secret-key cryptographic algorithm, the best known of which is the DES (standing for Data Encryption Standard in English and American literature) algorithm. Other secret-key algorithms exist, such as the RC5 algorithm or the COMP128 algorithm. This list is of course not exhaustive.

In general terms and succinctly, the function of these algorithms is to calculate an enciphered message from a message applied as an input (to the card) by a host system (server, bank dispenser etc) and the secret key contained in the card, and to supply this enciphered message in return to the host system, which for example enables the host system to authenticate the component or the card, to exchange data etc.

However, it has become clear that these components or cards are vulnerable to attacks consisting of a differential analysis of current consumption and which enable ill-intentioned third parties to find the secret key. These attacks are known as DPA attacks, the English acronym for Differential Power Analysis.

The principle of these DPA attacks is based on the fact that the current consumption of the microprocessor executing instructions varies according to the data being manipulated.

Notably, an instruction of the microprocessor manipulating a data bit generates two different current profiles depending on whether the bit is equal to "1" or "0". Typically, if the instruction is manipulating a "0", there is, at this moment of execution, a first magnitude of the current consumed and, if the instruction is manipulating a "1", there is a second magnitude of the current consumed, different from the first.

The characteristics of the cryptographic algorithms are known: calculations made, parameters used. The only unknown is the secret key contained in the program memory. This cannot be deduced solely from knowledge of the message applied as an input and the enciphered message supplied in return.

However, in a cryptographic algorithm, certain calculated data depend solely on the message applied in clear at the input to the card and the secret key contained in the card. Other data calculated in the algorithm can thus be recalculated solely from the enciphered message (generally supplied in clear at the output from the card to the host system) and the secret key contained in the card. More precisely, each bit of these particular data can be determined from the input or output message, and from a limited number of particular bits of the key.

Thus, to each bit of a particular data item there corresponds a subkey formed by a particular group of bits of the key.

The bits of these particular data which can be predicted are hereinafter referred to as target bits.

The basic idea of the DPA attack is thus to use the difference in current consumption profile of an instruction depending on whether it is manipulating a "1" or "0" and the possibility of calculating a target bit through the instructions of the algorithm from a known input or output message and a hypothesis on the corresponding subkey.

The principle of the DPA attack is therefore to test a given subkey hypothesis, applying, to a large number of current measurement curves, each relating to a known input message of the attacker, a Boolean selection function, according to the subkey hypothesis, and defined for each curve by the value predicted for a target bit.

By forming a hypothesis on the subkey concerned, it is in fact possible to predict the value "0" or "1" which this target bit will take for a given input or output message.

It is then possible to apply, as a Boolean selection function, the value, "0" or "1" predicted by the target bit for the subkey hypothesis in question, in order to sort these curves into two packets: a first packet includes the curves which have seen the manipulation of the target bit at "0" and a second packet contains the curves which have seen the manipulation of the target bit at "1" according to the subkey hypothesis. By taking the average current consumption in each packet, a mean consumption curve $M0(t)$ for the first packet and a mean consumption curve $M1(t)$ for the second packet are obtained.

If the subkey hypothesis is correct, the first packet actually contains all the curves amongst the N curves which have seen the manipulation of the target bit at "0" and the second packet actually contains all the curves amongst the N curves which have seen the manipulation of the target bit at "1". The mean consumption curve $M0(t)$ of the first packet will then have a mean consumption everywhere except at the moments of execution of the critical instructions, with a current consumption profile characteristic of the manipulation of the target bit at "0" (profile$_0$). In other words, for all these curves all the bits manipulated have had as many chances of equalling "0" as of equalling "1", except for the target bit, which has always had the value "0". This can be written:

$$M0(t)=[\text{profile}_0+\text{profile}_1)/2]_{t\ tci}{}^1+[\text{profile}_0]_{tci}$$

that is to say $$M0(t)=[Vm_t]_{t\ tci}{}^1=[\text{profile}_0]_{tci}$$

where tci represents the critical moments, at which a critical instruction has been executed.

Likewise, the mean consumption curve $M1(t)$ of the second packet corresponds to a mean consumption everywhere except at the moments of execution of the critical instructions, with a current consumption profile characteristic of the manipulation of the target bit at "1" (profile$_1$). It is possible to write:

$$M1(t)=[(\text{profile}_0+\text{profile}_1)/2]_{t\ tci}{}^1+[\text{profile}_1]_{tci}$$

that is to say $$M1(t)=[Vm_t]_{t\ tci}{}^1+[\text{profile}_1]_{tci}$$

It has been seen that the two profiles profile$_0$ and profile$_1$ are not equal. The difference between the curves M0($t$) and M1($t$) then gives a signal DPA(t) whose magnitude is equal to profile$_0$-profile$_1$ at the critical moments tci of execution of the critical instructions manipulating this bit, that is to say, in the example depicted in FIG. 1, at the points tc0 to tc6 and whose magnitude is approximately equal to zero outside the critical moments.

If the subkey hypothesis is wrong, the sorting does not correspond to reality. Statistically, there are then in each packet as many curves which have actually seen the manipulation of the target bit at "0" as there are curves which have seen the manipulation of the target bit at "1". The resulting mean curve M0($t$) is then situated around a mean value given by (profile$_0$+profile$_1$)/2=Vm, since, for each of the curves, all the bits manipulated, including the target bit, have as many chances of equalling "0" as of equalling "1".

The same reasoning on the second packet leads to a mean current consumption curve M1($t$) whose magnitude is situated around a mean value given by (profile$_0$+profile$_1$)/2=Vm.

The signal DPA(t) supplied by the difference M0(t)−M1(t) is in this case substantially equal to zero. The signal DPA(t) in the case of a wrong subkey hypothesis is depicted in FIG. 2. Thus the DPA attack exploits the difference in the current consumption profile during the execution of an instruction according to the value of the bit manipulated, in order to effect a sorting of current consumption curves according to a Boolean selection function for a given subkey hypothesis. By effecting a differential analysis of the mean current consumption between the two packets of curves obtained, an information signal DPA(t) is obtained.

The execution of a DPA attack then consists overall of:
a—drawing N random messages (for example N equal to 1000);
b—making the card execute the algorithm for each of the N random messages, reading the current consumption curve on each occasion (measured on the supply terminal of the component);
c—forming a hypothesis on a subkey;
d—predicting, for each of the random messages, the value taken by one of the target bits whose value depends only on the bits of the message (input or output) and on the subkey taken as a hypothesis, in order to obtain the Boolean selection function;
e—sorting the curves according to this Boolean selection function (that is to say according to the value "0" or "1" predicted for this target bit for each curve under the subkey hypothesis);
f—calculating in each packet the resulting mean current consumption curve;
g—effecting the difference of these mean curves, in order to obtain the signal DPA(t).

If the hypothesis on the subkey is correct, the Boolean selection function is correct and the curves of the first packet actually correspond to the curves for which the message applied as an input or output has given a target bit at "0" in the card and the curves of the second packet actually correspond to the curves for which the message applied as an input or output has given a target bit at "1" in the card.

The case in FIG. 1 applies: the signal DPA(t) is therefore not zero at instants tc0 to tc6 corresponding to the execution of the critical instructions (those which manipulate the target bit). It suffices for there to be at least one critical instant in the acquisition period.

It should be noted that the attacker does not need to know precisely the critical instants.

If the subkey hypothesis is not correct, the sorting does not correspond to reality and there are therefore in each packet as many curves corresponding in reality to a target bit at "0" as there are curves corresponding to a target bit at "1". The signal DPA(t) is substantially nil throughout (the case depicted in FIG. 2). It is necessary to return to step c and to form a new hypothesis on the subkey.

If the hypothesis proves correct, the evaluation of other subkeys can be passed to, until the key has been reconstituted to the maximum possible extent. For example, with a DES algorithm, a 64-bit key is used, of which only 56 are useful bits. With a DPA attack, it is possible to reconstitute at least 48 bits of the 56 useful bits.

SUMMARY OF THE INVENTION

The purpose of the present invention is to use, in an electronic component, a countermeasure method which does not enable the attacker to generate the signal DPA(t). This is achieved by varying the key dynamically.

The present invention assumes the sharing of a common secret between two electronic components communicating with each other. These components will hereinafter be designated in FIGS. 7 and 8 by the references C (a card) and T (a terminal) but can take various other forms obvious to experts. Amongst these two components, C is assumed to be potentially exposed to the DPA. Through the inventive countermeasure, the electronic component C is protected against DPA attacks.

According to the invention, the countermeasure method enables T and C to calculate, in a synchronised manner, a session key unknown to the outside world and to use this key in an enciphering, authentication or MAC cryptographic protocol or any other cryptographic function requiring a secret-key algorithm.

In order to minimise the exposure of the secret data item shared between C and T, this secret data item will be exposed only indirectly and will change over time, the key used at the session i being a function of the key of the previous session (used at session i−1). Each session key, denoted K[i], will be manipulated at most twice:
when it is created from the key $k_{i-1}$;
when it is used in the application.

In the invention, the concern will be with an algorithm of the DES type. This DES algorithm comprises sixteen identical calculation rounds; in this algorithm it has been shown that the data which can be predicted by an attacker are situated at the first round and at the last round and that the critical instructions in terms of the DPA attack are situated in the first three rounds and the last three rounds.

One aim of the invention is therefore to make the data manipulated by the critical instructions invisible by ensuring that these data are changed from one application of the algorithm to another. As characterised, the invention therefore concerns a countermeasure method in an electronic component C using a cryptographic algorithm A with a secret key k[0] of size k in order to calculate an enciphered message from an input message. According to the invention, a session key k[i] is formed from the previous session key k[i−1] whilst supplying to the terminal T the index i in a non-confidential manner. Possessing k[0] and i, the terminal T can calculate k[i] without having to calculate all the intermediate keys k[1], k[2], . . . , k[i−1].

The implementation of the countermeasure method is characterised by a change in K[i] between the successive uses of A, i being the number of executions of the algorithm A, using the rule:

$$K[i]=f(K[i-1]),$$

f being a function taking a key as an input and returning a key as an output.

In one embodiment, the key k[i] is formed by squaring the key k[i-1] modulo a prime number whose size is that of the key.

The function f(x), x being a variable, is such that:

$$F(x)=x^2 \bmod z,$$

in which z is a constant such that the calculation shortcut used by T is formulated by $K[i]=k[0]^{(2^i)} \bmod z$, in which the quantity $2^I$ is calculated modulo phi(z), wherein phi(z) is the Euler phi function. It should be noted that an integer power (number e) other than two can be used in the inventive method; for example, it is also possible to define:

$$f(x)=x^3 \bmod z.$$

The corresponding calculation shortcut then being $K[i]=K[0]^{(3^i)} \bmod z$. Where the quantity $3^i$ is calculated modulo phi(z).

In another embodiment, the key k[i] is formed by multiplying the key k[i-1] by a constant c modulo a prime number whose size is that of the key.

The function f(x), x being a variable, is such that:

$$f(x)=x*c \bmod z,$$

in which z and c are constants such that the calculation shortcut used by T is $K[i]=K[0]*c^i \bmod z$.

Preferentially, z is the largest prime number less than $2^k$.

According to another embodiment of the invention, the latter also relates to a countermeasure method in a first electronic component (C) communicating with a second electronic component (T) and using a cryptographic algorithm B using the method described above where the secret key consists of a series of bytes to which the invention method is applied modulo a small prime number, the key K[i-1] consisting of a series of L bytes, the use of the countermeasure method of K[i-1] between the successive uses of B[i-1] being the number of executions of the algorithm B using the rule:

$$K[i-1]=\{B[1,i-1], \ldots, B[L,i-1]\},$$

The said rule being transformed into K[i] by undergoing the transformation for t ranging from 1 to L:

B[t, i]=B[t, i-1]^2 mod U where U is a prime number of a byte, for example 251,

The key K [i] being calculated using the calculation shortcut t ranging from 1 to L:

$B[t, i]=B[t, i-1]^{(2^i)} \bmod U$ in which formulation the quantity $2^i$ is calculated modulo phi(U).

Preferentially, this second embodiment relates to a countermeasure method where the key K[i-1] consists of a series of bytes to which the inventive method is applied modulo a small prime number, characterised in that the key K[i-1] consists of a series of L bytes:

$$K[i-1]=\{B[1,i-1], \ldots, B[L,i-1]\},$$

And is then transformed into K[i] by undergoing the transformation for t ranging from 1 to L:

B[t, i]=B[t, i-1]*c[t] mod U where U is a prime number of a byte, for example 251, the key K[i] then being calculated using the calculation shortcut for t ranging from 1 to L:

$$B[t,i]=B[t,i-1]*c[t]^i \bmod U.$$

More preferentially still for this particular embodiment where the terminal and the card perform the calculation of the session key K[i] on more than the number of bytes necessary to the secret-key enciphering algorithm in which this key should be used and then chop the resulting key in order to obtain the number of bytes necessary to the secret-key enciphering algorithm. This in order to compensate for the loss in entropy resulting from the use of moduli U smaller than the number 256.

Preferentially, the number U is of one, two, three, four, five or six bytes.

Naturally, the invention also relates to a smart card and an electronic terminal for this last particular embodiment.

BRIEF DESCRIPTION OF THE DRAWINGS

Other characteristics and advantages of the invention are detailed in the following description given by way of indication and in no way limitatively, and with reference to the accompanying drawings, in which:

FIG. 5 is a block diagram of the operation SBOX used in the DES algorithm;

FIG. 6 shows an example of a one-input one-output elementary constant table used in the operation SBOX;

DESCRIPTION OF THE INVENTION

The countermeasure of the present invention is not specific to the DES, although the following description is chosen, and can apply equally to other secret-key algorithms (such as DES, IDEA, AES, FEAL, triple DES, BlowFish, SAFER, SHA-MAC, RIPEMD, DFC, RC5, RC6 or SEAL); in the remainder of our disclosure, the general case will therefore be considered of an algorithm A(M, K) (initially vulnerable to DPA) where K is a key of size k,M the message.

Figure 1:
FIGS. 1 and 2, already described, depict the signal DPA(t) which can be obtained according to a hypothesis on a subkey of the secret key K according to a DPA attack.
Figure 2:
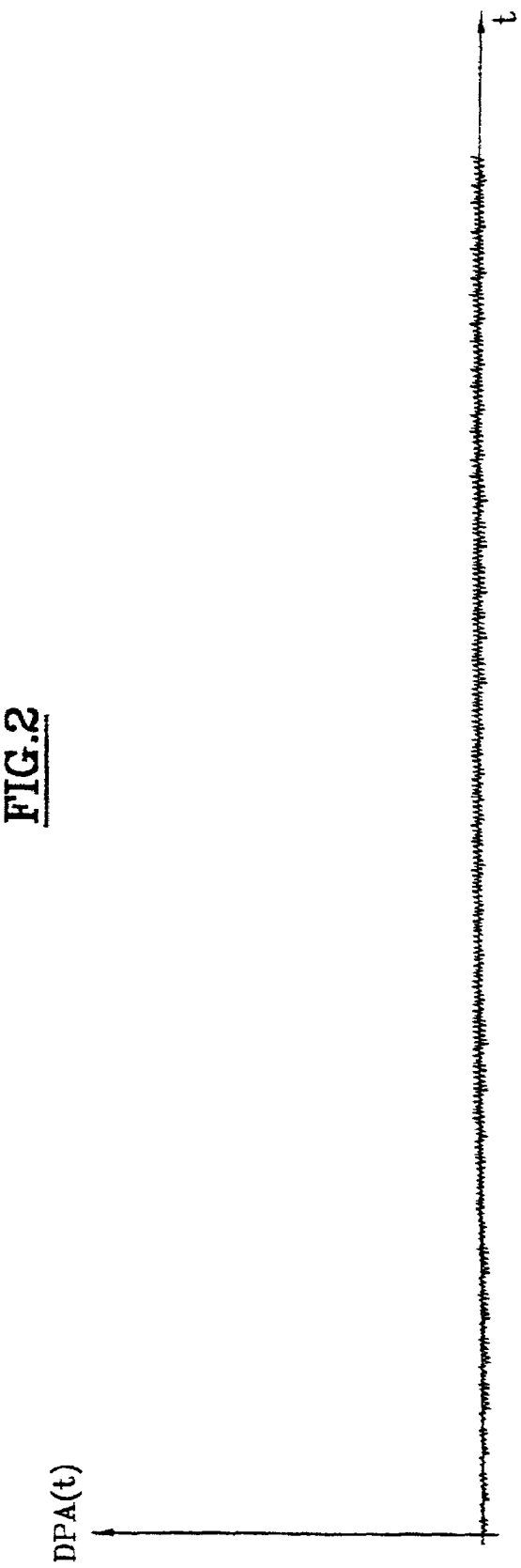
Figure 3:
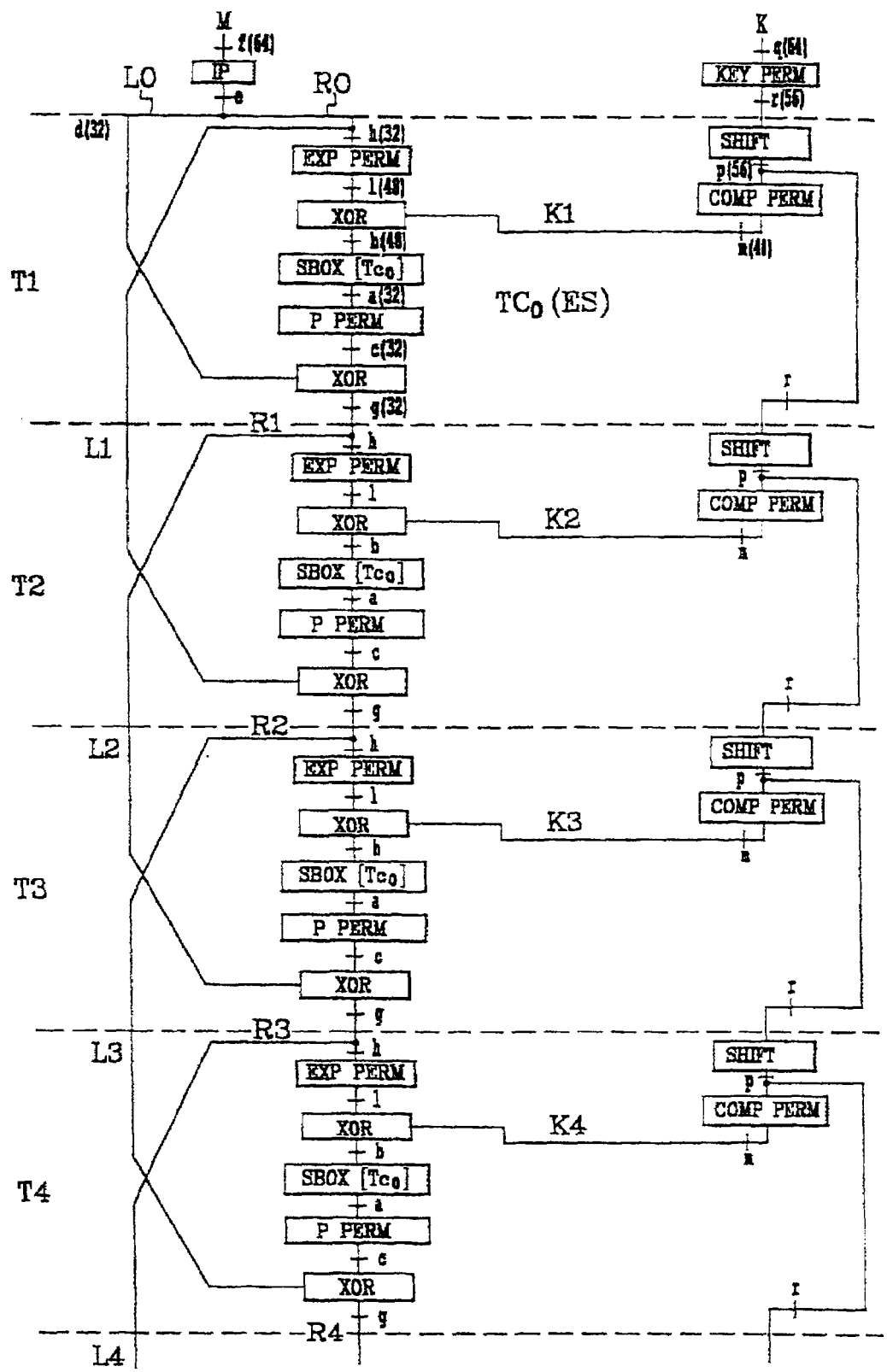
FIGS. 3 and 4 are flow diagrams representing the first rounds and the last rounds of the DES algorithm.
Figure 4:
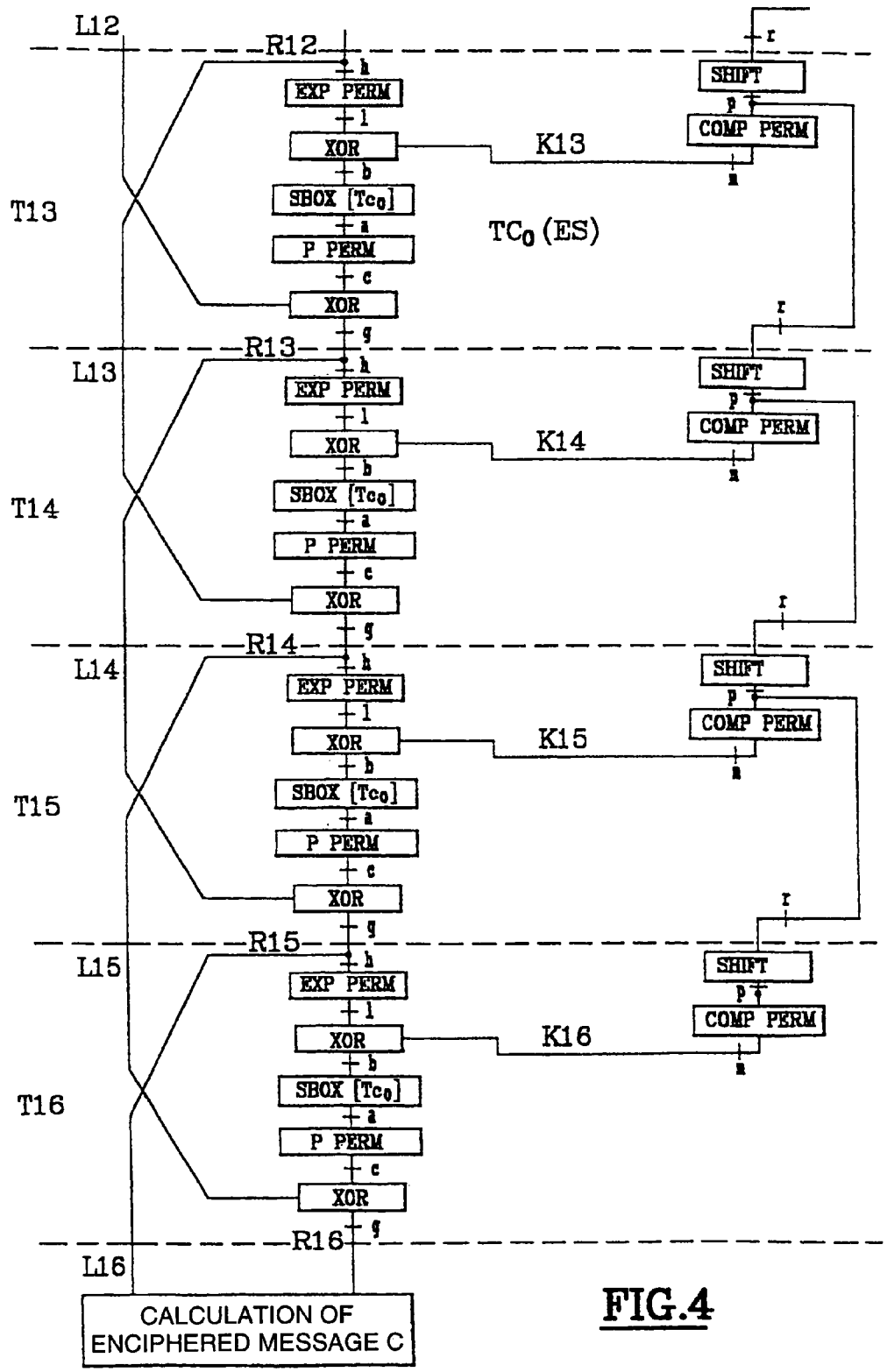

The DES secret-key cryptographic algorithm (hereinafter the term DES will more simply be used for the DES algorithm) comprises 16 calculation rounds, denoted T1 to T16, as depicted in FIGS. 3 and 4.

The DES begins with an initial permutation IP on the input message M (FIG. 3). The input message M is a word f of 64 bits. After permutation, a word e of 64 bits is obtained, which is divided into two in order to form the input parameters L0 and R0 of the first round (T1). L0 is a word d of 32 bits containing the 32 most significant bits of the word e. R0 is a word h of 32 bits containing the 32 least significant bits of the word e.

The secret key K, which is a word q of 64 bits, itself undergoes a permutation and compression in order to supply a word r of 56 bits.

The first round comprises an operation EXP PERM on the parameter R0, consisting of an expansion and a permutation, in order to supply as an output a word 1 of 48 bits.

This word 1 is combined with a parameter K1, in an operation of the exclusive OR type denoted XOR, in order to supply a word b of 48 bits. The parameter K1, which is a word m of 48 bits, is obtained from the word r by a shift by one position (operation denoted SHIFT in FIGS. 3 and 4) followed by a permutation and compression (the operation denoted COMP PERM).

The word b is applied to an operation denoted SBOX, at the output of which a word a of 32 bits is obtained. This particular operation will be explained in more detail in relation to FIGS. 5 and 6.

The word a undergoes a permutation P PERM, giving as an output the word c of 32 bits.

This word c is combined with the input parameter L0 of the first round T1, in a logic operation of the EXCLUSIVE OR type, denoted XOR, which supplies as an output the word g of 32 bits.

The word h (=R0) of the first round supplies the input parameter L1 of the following round (T2) and the word g of the first round supplies the input parameter R1 of the following round. The word p of the first round supplies the input r of the following round.

The other rounds T2 to T16 take place in a similar fashion, except with regard to the shift operation SHIFT which is effected on one or two positions according to the rounds in question.

Each round Ti thus receives as an input the parameters Li−1, Ri−1 and r and supplies as an output the parameters Li and Ri and r for the following round Ti+1.

At the end of the DES algorithm (FIG. 4), the enciphered message is calculated from parameters L16 and R16 supplied by the last round T16.

This calculation of the enciphered message C comprises in practice the following operations:
formation of a word e' of 64 bits by reversing the position of the words L16 and R16, and then by concatenating them;
application of the permutation IP$^{-1}$ which is the reverse of that of the start of the DES, in order to obtain the word f' of 64 bits forming the enciphered message C.

The operation SBOX is detailed in FIGS. 5 and 6. It comprises a table of constants $TC_0$ in order to supply an output data item a as a function of an input data item b.

In practice, this table of constants $TC_0$ is in the form of eight tables of elementary constants $TC_0 1$ to $TC_0 8$, each receiving as an input only 6 bits of the word b, in order to supply as an output only 4 bits of the word a.

Thus the table of elementary constants $TC_0 1$ depicted in FIG. 6 receives, as an input data item, the bits b1 to b6 of the word b and supplies as an output data item the bits a1 to a4 of the word a.

In practice these eight tables of elementary constants $TC_0 1$ to $TC_0 8$ are stored in the program memory of the electronic component.

In the operation SBOX of the first round T1, a particular bit of the data item a output from the table of constants $TC_0$ depends on only 6 bits of the data item b applied as an input, that is to say only 6 bits of the secret key K and of the input message (M).

In the operation SBOX of the last round T16, a particular bit of the data item a output from the table of constants $TC_0$ can be recalculated from only 6 bits of the secret key K and the enciphered message (C).

However, if the principle of the DPA attack is taken up again, if a bit of the output data item a is chosen as a target bit, it suffices to form a hypothesis on 6 bits of the key K, in order to predict the value of a target bit for a given input message (M) or output message (C). In other words, for the DES, it suffices to form a hypothesis on a subkey of 6 bits.

In a DPA attack on such an algorithm for a given target bit, it is therefore necessary to discriminate just one subkey hypothesis amongst 64 possible ones.

Thus, by taking only eight bits of the word a as target bits (one output bit per table of elementary constants $TC_0 1$ to $TC_0 8$), it is possible to discover up to 6×8=48 bits of the secret key, by making DPA attacks on each of these target bits.

In the DES, instructions which are critical within the context of DPA attacks are therefore found at the start of the algorithm and at the end.

At the start of the DES algorithm, the data which can be predicted from an input message M and a subkey hypothesis are the data a and g calculated in the first round (T1).

The data item a of the first round T1 (FIG. 3) is the output data item of the operation SBOX of the round in question. The data item g is calculated from the data item a, by permutation (P PERM) and exclusive OR operation with the input parameter L0.

In fact, the data item c of the first round is a data item derived from the data item a of the first round. The derived data item c corresponds to a simple permutation of bits of the data item a.

The data item 1 of the second round is a data item derived from the data item g of the first round, since it corresponds to a permutation of the bits of the g, certain bits of the word g also being duplicated.

Knowing a and g, it is also possible to know these derived data.

The critical instructions of the start of the algorithm are the critical instructions which manipulate either the data item which can be predicted, such as the data item a of the first round, or a derived data item.

The critical instructions manipulating the data item a of the first round T1 or the derived data item c are thus the instructions of the end of the operation SBOX, of the operation P PERM and of the start of the operation XOR of the first round T1.

The critical instructions manipulating the data item g or derived data are all the instructions of the end of the operation XOR of the end of the first round T1 up to the instructions of the start of the operation SBOX of the second round T2, and of the start of the operation XOR at the end of the third round T3 (L2=h(T2)=g(T1)).

At the end of the DES algorithm, the data which can be predicted from an enciphered message C and a subkey hypothesis are the data item a of the sixteenth round T16 and the data item L15 equal to the word h of the fourteenth round T14.

The critical instructions manipulating the data item a of the sixteenth round or the derived data are the instructions of the sixteenth round of the end of operation SBOX, of the permutation operation P PERM and start of operation XOR.

For the data item L15, the critical instructions manipulating this data item or derived data are all the instructions after the instructions of the end of operation XOR of the fourteenth round T14, up to the instructions of the start of the operation SBOX of the fifteenth round T15, plus the instructions for the start of operation XOR of the sixteenth round T16.

The countermeasure method according to the invention applied to this DES algorithm consists in having, for each critical instruction, as many chances for the critical instruction to manipulate a data item as its complement. Thus, whatever the target bit on which the DPA attack may be made, there are as many chances for the critical instructions, which manipulate this bit, to manipulate a "1" or a "0".

In practice, this must be true for each of the potential target bits: in other words, the attacker having the choice between several possible attacks, that is to say between several possible Boolean selection functions for effecting his sorting of curves, for a given subkey hypothesis, the implementation of the countermeasure method according to the invention must endeavour to ensure that the data manipulated by each of the critical instructions randomly take, one time out of two, a value or its complement. With regard to the application of the countermeasure method according to the invention to the DES algorithm, it is therefore necessary to apply the countermeasure to the critical start of DES instructions and to the critical end of DES instructions, in order to be totally protected.

In the DES, all the data manipulated by critical instructions are an output data item or data derived from an output data item of an operation SBOX.

In fact, at the start of the DES, the data which can be predicted are the data a and g of the first round T1. The data item a is the output data item of the operation SBOX of the first round. The data item g is calculated from the data item a, since g=P PERM(a) XOR L0. g is therefore a data item derived from the output data item a of the operation SBOX of the first round. Thus all the data manipulated by the critical start of DES instructions stem directly or indirectly from the output data item a of the operation SBOX of the first round.

With regard to the end of the DES, the data which can be predicted are the data item a of the sixteenth round T16 and the data item g of the fourteenth round T14, g being equal to L15.

The data item a is the output data item of the operation SBOX of the sixteenth round T16.

As for the data item L15, this is calculated, in the normal execution of the DES algorithm, from the output data item a of the operation SBOX of the fourteenth round T14: L15=P PERM(a) XOR L14.

If the output data a of these particular operations SBOX are made unpredictable, all the derived data are also made unpredictable: all the data manipulated by the critical instructions of the DES algorithm are therefore made unpredictable. If it is considered that these operations SBOX constitute first means for supplying an output data item S=a from an input data item E=b, the countermeasure method applied to the DES algorithm consists of using other means for making the output data item unpredictable, so that this output data item and/or derived data manipulated by the critical instructions are all unpredictable.

According to the invention, a group formed by the first three rounds at least and another group formed by the last three rounds at least are formed. These groups therefore contain all the rounds comprising critical instructions.

A first sequence using the first means for all the rounds and a second sequence using the other means for at least some rounds are associated with these two groups.

In the other rounds which are not in these groups, it is possible to continue to use the first means.

The use of these other means is such that the result output, that is to say the enciphered message, remains correct.

These other means can comprise several different means. They are such that they make the complemented data item correspond to one or other data item amongst the input and output data of the first means.

Thus, considering a large number of executions, the groups will on average use the first sequence, which is the normal sequence of the algorithm, one time out of two, and the other sequence one time out of two. The data manipulated by the critical instructions in these groups, corresponding to certain intermediate results, will therefore on average be complemented one time out of two. On a large number of curves there will therefore be statistically as many chances for a given target bit to be at 1 or at 0.

Figure 7:
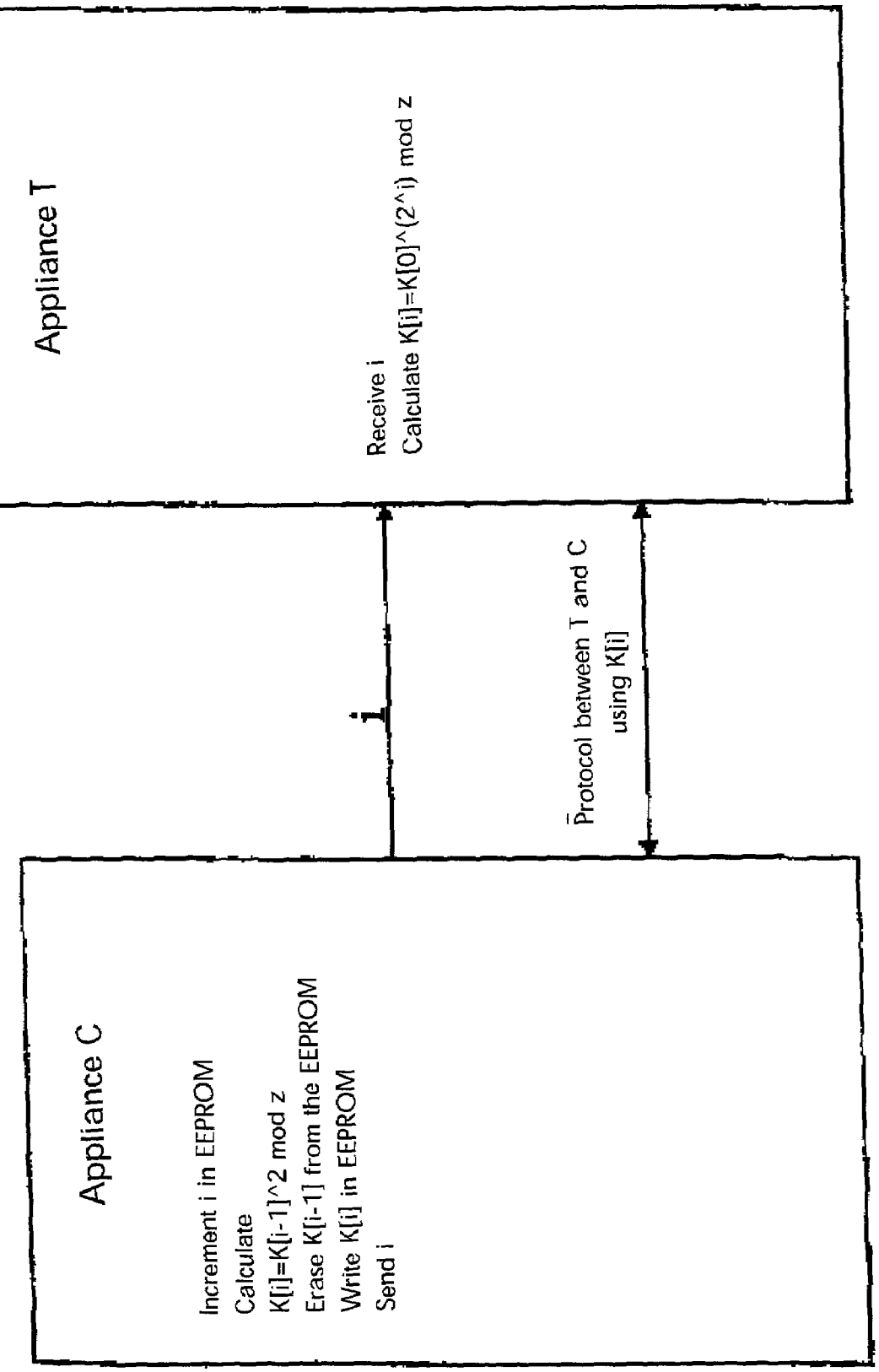
FIG. 7 depicts a first example of a flow diagram for executing the DES with a countermeasure method according to the invention.

According to FIG. 7, which depicts a first example of a flow diagram for execution of the DES with a countermeasure method according to the invention, the communication with the component T (Terminal) and C (Card) is governed by the exchange of the signals according to steps 1 to 6 described below:

1. C increments i in its non-volatile memory (for example EEPROM);
2. C generates the session key $K[i]=K[i-1]^2$ mod z;
3. C erases the key K[i−1] from its non-volatile memory (for example EEPROM) and enters K[i] in its place;
4. C communicates i to T;
5. T calculates $K[i]=K[0]^{(2^i)}$ mod z where the quantity $2^i$ is calculated modulo phi(z);
6. C and T initiate a cryptographic calculation using K[i].

Figure 8:
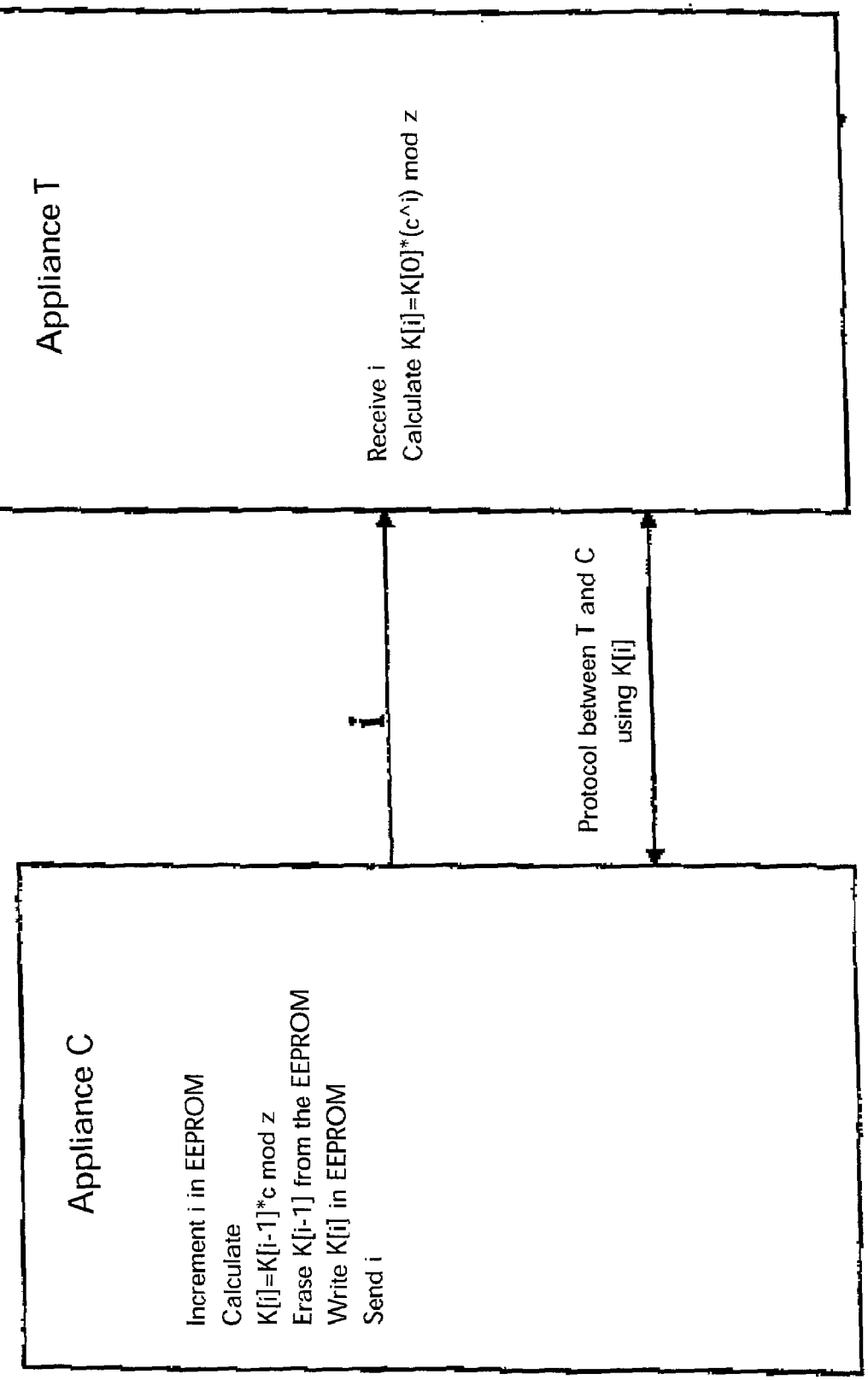
FIG. 8 depicts a second example of a flow diagram for executing the DES with a countermeasure method according to the invention.

Alternatively, according to FIG. 8, which depicts a second example of a flow diagram for executing the DES with a countermeasure method according to the invention, the communication between C and T is governed by the exchange of signals according to steps 1 to 6 described below:

1. C increments i in its non-volatile memory (for example EEPROM);
2. C generates the session key K[i]=K[i−1]*c mod z;
3. C erases the key K[i−1] from its non-volatile memory (for example EEPROM) and enters K[i] in its place;
4. C communicates i to T;
5. T calculates $K[i]=K[0]*(c^i)$ mod z;
6. C and T initiate a cryptographic calculation using K[i].

The optimum choice for the number z is the smallest prime number of size k. In particular:

| k = size of K in bits | value of z |
| --- | --- |
| 56 | $2^k - 5$ |
| 64 | $2^k - 59$ |
| 80 | $2^k - 65$ |
| 96 | $2^k - 17$ |
| 128 | $2^k - 159$ |
| 256 | $2^k - 189$ |

The invention claimed is:

1. A countermeasure method in a first electronic component communicating with a second electronic component using a cryptographic algorithm A with a secret key K[i] of size k, said method comprising the step of changing K[i] between successive uses of A, i being the number of executions of the algorithm A, wherein the secret key K[i] for the next iteration i of the algorithm A is calculated in the second electronic component by means of the formula:

$K[i]=f[(K[i-1])]$, where f is a function taking a key as an input and returning a key as an output, and wherein said first electronic component performs a calculation shortcut enabling it to calculate K[i] from K[0], for i>1, without having to generate the i−1 keys K[1], . . . , K[i−1] separating K[0] and K[i].

2. A countermeasure method according to claim 1, wherein i is supplied to said first electronic component by said second electronic component.

3. A countermeasure method according to claim 1, wherein the function f(x), x being a variable, is such that:

$$f(x)=x^e \bmod z,$$

in which z is a constant such that the calculation shortcut used by the second electronic component is K[i]=K[0]^(e^i) mod z, in which e is an integer and the calculation of e^i is performed modulo phi(z).

4. A countermeasure method according to claim 1, wherein the function f(x), x being a variable, is such that $$f(x)=x*c \bmod z$$

in which z and c are constants such that the calculation shortcut used by the second electronic component is K[i]=K[0]*c^i mod z.

5. A countermeasure method according to claim 4, wherein z is the largest prime number less than 2^k.

6. A countermeasure method according to claim 1, wherein the algorithm A is one of DES, IDEA, AES, FEAL, triple DES, BlowFish, SAFER, SHA-MAC, RIPEMD, DFC, RC5, RC6 or SEAL.

7. A smart card that communicates with another electronic component using a cryptographic algorithm A with a secret key K[i] of size k and implementing a countermeasure method that includes changing K[i] between successive uses of A, i being the number of executions of the algorithm A, wherein the secret key K[i] for the next iteration i of the algorithm A is calculated in the smart card by means of the formula:

$$K[i]=f[(K[i-1])],$$

where f is a function taking a key as an input and returning a key as an output, and wherein said other electronic component performs a calculation shortcut enabling it to calculate K[i] from K[0], for i>1, without having to generate the i−1 keys K[1], . . . , K[i−1] separating K[0] and K[i].

8. An electronic terminal that communicates with another electronic component using a cryptographic algorithm A with a secret key K[i] of size k and implementing a countermeasure method that includes changing K[i] between successive uses of A, i being the number of executions of the algorithm A, wherein the secret key K[i] for the next iteration i of the algorithm A is calculated in the other electronic component by means of the formula:

$$K[i]=f[(K[i-1])],$$

where f is a function taking a key as an input and returning a key as an output, and wherein said electronic terminal performs a calculation shortcut enabling it to calculate K[i] from K[0], for i>1, without having to generate the i−1 keys K[1], . . . , K[i−1] separating K[0] and K[i].

9. A countermeasure method in a first electronic component communicating with a second electronic component using a cryptographic algorithm B with a secret key K[i] that comprises a series of bytes and a key K[i−1] comprises a series of L bytes, said method comprising the step of changing K[i−1] between successive uses of B[i−1], i being the number of executions of the algorithm B, using the rule:

$$K[i-1]=\{B[1,i-1], \ldots, B[L,i-1]\},$$

said rule being transformed into K[i] by undergoing the following transformation for t ranging from 1 to L:

B[t, i]=B[t, i−1]^2 mod U where U is a prime number of a byte, and calculating the key K[i] using the following calculation shorthand for t ranging from 1 to L:

B[t, i]=B[t, i−1]^(2^i) mod U where the quantity 2^i is calculated modulo phi(U).

10. A countermeasure method according to claim 1 wherein the key K[i−1] consists of a series of L bytes:

$$K[i-1]=\{B[1,i-1], \ldots, B[L,i-1]\},$$

and is transformed into K[i] by undergoing the following transformation for t ranging from 1 to L:

B[t, i]=B[t, i−1]*c[t] mod U where U is a prime number of a byte, and the key K[i] is calculated using the following calculation shortcut for t ranging from 1 to L:

$$B[t,i]=B[t,i]-1*c[t]^i \bmod U.$$

11. A countermeasure method according to claim 10, where the electronic components perform the calculation of the session key K[i] over more than the number of bytes necessary for the secret-key enciphering algorithm in which this key is to be used and then chop the resulting key in order to obtain the number of bytes necessary for the secret-key enciphering algorithm, in order to compensate for a loss in entropy resulting from the use of modules U smaller than the number 256.

12. A countermeasure method according to claim 11, where the number U is of one, two, three, four, five or six bytes.

13. A smart card that communicates with another electronic component using a cryptographic algorithm B with a secret key K[i] that comprises a series of bytes and a key K[i−1] comprises a series of L bytes, and implementing a countermeasure method comprising the step of changing K[i−1] between successive uses of B[i−1], i being the number of executions of the algorithm B, using the rule:

$$K[i-1]=\{B[1,i-1], \ldots, B[L,i-1]\},$$

said rule being transformed into K[i] by undergoing the following transformation for t ranging from 1 to L:

B[t, i]=B[t, i−1]^2 mod U where U is a prime number of a byte, and calculating the key K[i] using the following calculation shorthand for t ranging from 1 to L:

B[t, i]=B[t, i−1](2^i) mod U where the quantity 2^i is calculated modulo phi(U).

14. An electronic terminal that communicates with another electronic component using a cryptographic algorithm B with a secret key K[i] that comprises a series of bytes and a key K[i−1] comprises a series of L bytes, and implementing a countermeasure method comprising the step of changing K[i−1] between successive uses of B[i−1], i being the number of executions of the algorithm B, using the rule:

$$K[i-1]=\{B[1,i-1], \ldots, B[L,i-1]\},$$

said rule being transformed into K[i] by undergoing the following transformation for t ranging from 1 to L:

B[t, i]=B[t, i1]^2 mod U where U is a prime number of a byte, and calculating the key K[i] using the following calculation shorthand for t ranging from 1 to L:

B[t, i]=B[t, i−1]^(2^i) mod U where the quantity 2^i is calculated modulo phi(U).

15. A countermeasure method according to claim 1, wherein z is the largest prime number less than $2^k$.

16. A countermeasure method according to claim 9, where the electronic components perform the calculation of the session key K[i] over more than the number of bytes necessary for the secret-key enciphering algorithm in which this key is to be used and then chop the resulting key in order to obtain the number of bytes necessary for the secret-key enciphering algorithm, in order to compensate for a loss in entropy resulting from the use of modules U smaller than the number 256.

17. A countermeasure method according to claim 16, where the number U is of one, two, three, four, five or six bytes.

* * * * *